(12) United States Patent
Lee et al.

(10) Patent No.: US 12,719,103 B2
(45) Date of Patent: Aug. 25, 2026

(54) BATTERY MODULE, BATTERY PACK AND VEHICLE, EACH INCLUDING THE SAME

(71) Applicant: LG ENERGY SOLUTION, LTD., Seoul (KR)

(72) Inventors: Jung-Hoon Lee, Daejeon (KR); Se-Ho Kim, Daejeon (KR); Jae-Hun Yang, Daejeon (KR); Sang-Yoon Jeong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 631 days.

(21) Appl. No.: 17/792,352

(22) PCT Filed: Sep. 9, 2021

(86) PCT No.: PCT/KR2021/012308

§ 371 (c)(1),
(2) Date: Jul. 12, 2022

(87) PCT Pub. No.: WO2022/114472

PCT Pub. Date: Jun. 2, 2022

(65) Prior Publication Data

US 2023/0048587 A1 Feb. 16, 2023

(30) Foreign Application Priority Data

Nov. 26, 2020 (KR) ........................ 10-2020-0161650

(51) Int. Cl.
*H01M 10/6551* (2014.01)
*H01M 10/613* (2014.01)
(Continued)

(52) U.S. Cl.
CPC ..... *H01M 10/6551* (2015.04); *H01M 10/613* (2015.04); *H01M 10/625* (2015.04);
(Continued)

(58) Field of Classification Search
CPC ........... H01M 10/6551; H01M 10/613; H01M 10/647; H01M 10/6555; H01M 10/6556;
(Continued)

(56) References Cited

U.S. PATENT DOCUMENTS 11,362,391 B2 * 6/2022 Kim .................... H01M 10/613
11,594,780 B2 * 2/2023 Yoo ..................... H01M 50/502
(Continued)

FOREIGN PATENT DOCUMENTS

CN 109119552 A 1/2019
CN 208782498 U 4/2019
(Continued)

*Primary Examiner* — Stewart A Fraser
*Assistant Examiner* — Lilia Nedialkova
(74) *Attorney, Agent, or Firm* — BRYAN CAVE LEIGHTON PAISNER LLP

(57) ABSTRACT

A battery module, and a battery pack and a vehicle, each including the battery module. The battery module includes a frame; a plurality of battery cells arranged in the frame; a heat sink in contact with one side of the battery cell; and a cooling fin in contact with the heat sink and in contact with the other side of the battery cell.

9 Claims, 5 Drawing Sheets

(51) Int. Cl.
*H01M 10/625* (2014.01)
*H01M 10/647* (2014.01)
*H01M 50/26* (2021.01)

(52) U.S. Cl.
CPC ......... *H01M 10/647* (2015.04); *H01M 50/26* (2021.01); *H01M 2220/20* (2013.01)

(58) Field of Classification Search
CPC ........... H01M 2220/20; H01M 50/209; H01M 50/26; Y02E 60/10
See application file for complete search history.

(56) References Cited

U.S. PATENT DOCUMENTS

| | | | | |
|---|---|---|---|---|
| 2007/0212037 | A1* | 9/2007 | Koenekamp | H01M 8/04037 392/468 |
| 2009/0253026 | A1* | 10/2009 | Gaben | B60R 16/04 429/120 |
| 2012/0045681 | A1 | 2/2012 | Klaus et al. | |
| 2016/0111761 | A1* | 4/2016 | Kopra | H01M 10/653 429/120 |
| 2017/0263986 | A1 | 9/2017 | Subramanian et al. | |
| 2019/0074557 | A1* | 3/2019 | Shin | H01M 10/6553 |
| 2019/0257891 | A1* | 8/2019 | Kim | G01R 31/392 |
| 2020/0220128 | A1* | 7/2020 | Kim | H01M 10/6553 |
| 2020/0343604 | A1* | 10/2020 | Lee | H01M 50/553 |
| 2020/0388805 | A1 | 12/2020 | Yoo et al. | |
| 2021/0184303 | A1* | 6/2021 | Lee | H01M 10/647 |
| 2021/0351452 | A1* | 11/2021 | Yamashiro | H01M 10/6551 |
| 2022/0231366 | A1 | 7/2022 | Kim et al. | |

FOREIGN PATENT DOCUMENTS

| | | | | | |
|---|---|---|---|---|---|
| CN | 210984801 | U | | 7/2020 | |
| CN | 111584972 | A | | 8/2020 | |
| JP | 2012174408 | | | 9/2012 | |
| JP | 5161533 | B2 | | 3/2013 | |
| JP | 2014504779 | | | 2/2014 | |
| JP | 2016-039111 | A | | 3/2016 | |
| JP | 2020-077559 | A | | 5/2020 | |
| JP | 2020513655 | | | 5/2020 | |
| JP | 2020523748 | | | 8/2020 | |
| KR | 10-2015-0049950 | A | | 5/2015 | |
| KR | 10-1731337 | B1 | | 4/2017 | |
| KR | 10-1800397 | B1 | | 11/2017 | |
| KR | 10-2018-0017695 | A | | 2/2018 | |
| KR | 20180026172 | | * | 3/2018 | H01M 10/655 |
| KR | 10-2018-0091600 | A | | 8/2018 | |
| KR | 10-1910244 | B1 | | 12/2018 | |
| KR | 10-2019-0053574 | A | | 5/2019 | |
| KR | 20190105731 | | | 9/2019 | |
| KR | 10-2020-0030964 | A | | 3/2020 | |
| WO | WO-2019107795 | A1 | * | 6/2019 | B60L 50/64 |
| WO | 2020027299 | | | 2/2020 | |
| WO | 2020055219 | | | 3/2020 | |

* cited by examiner

BATTERY MODULE, BATTERY PACK AND VEHICLE, EACH INCLUDING THE SAME

CROSS-REFERENCE TO RELATED APPLICATIONS

This application is a US national phase of international Application No. PCT/KR2021/012308 filed Sep. 9, 2021, and claims priority to Korean Patent Application No. 10-2020-0161650 filed on Nov. 26, 2020, the disclosures of which are incorporated by reference as if fully set forth herein.

TECHNICAL FIELD

The present disclosure relates to a battery module, and a battery pack and a vehicle, each including the battery module, and more particularly, to a battery module capable of improving cooling performance, and a battery pack and a vehicle, each including the battery module.

BACKGROUND

The demand for secondary batteries as an energy source is rapidly increasing as technological development of and demand for mobile devices increase. Although nickel cadmium batteries or hydrogen ion batteries have been used as secondary batteries in the related art, recently, lithium secondary batteries that are freely charged and discharged, have very low self-discharge rate, and have high energy density have been widely used because these batteries have almost no memory effect compared to nickel-based secondary batteries.

Such a lithium secondary battery mainly uses lithium-based oxides and carbon materials as positive electrode active materials and negative electrode active materials, respectively. The lithium secondary battery includes an electrode assembly in which a positive electrode plate and a negative electrode plate on which a positive electrode active material and a negative electrode active material are respectively coated are arranged with a separator interposed therebetween, and a sheath material, that is, a battery case, that seals and accommodates the assembly together with an electrolyte solution.

The lithium secondary battery includes a positive electrode, a negative electrode, a separator interposed therebetween, and an electrolyte, and includes a lithium ion battery (LIB), a polymer lithium ion battery (PLIB), etc. according to which positive electrode active material and negative electrode active material are used. In general, the electrodes of the lithium secondary batteries are formed by coating a positive electrode active material or a negative electrode active material on a current collector such as an aluminum or copper sheet, a mesh, a film, or a foil, and then drying the positive electrode active material or the negative electrode active material.

In addition, various types of secondary batteries have a cover capable of protecting a plurality of battery cells, and include a plurality of battery modules in which the plurality of battery cells are stacked and inserted into the cover, and a battery pack including the plurality of battery modules.

The battery cells may be electrically connected to each other through a bus bar that is a conductor. In general, a positive electrode lead is manufactured of an aluminum material, a negative electrode lead is manufactured of a copper material, and the bus bar is also manufactured of a copper material.

In the case of a related art battery module, a battery cell is coupled to a cooling fin, the cooling fin coupled to the battery cell is coupled to a heat sink, and heat generated from the battery cell is dissipated through the heat sink coupled to the cooling fin, forming an indirect cooling method.

However, such an indirect cooling method of the battery cell has a problem in that cooling efficiency decreases when the capacity of the battery cell increases, and a variation in cooling performance increases according to the adhesion between the cooling fin and the heat sink.

SUMMARY

The present disclosure is designed to solve the problems of the related art, and therefore the present disclosure is directed to providing a battery module capable of improving cooling performance even when the capacity of a battery cell increases, and a battery pack and a vehicle, each including the battery module.

These and other objectives and advantages of the present disclosure may be understood from the following detailed description and will become more fully apparent from the exemplary embodiments of the present disclosure. Also, it will be easily understood that the objectives and advantages of the present disclosure may be realized by the means shown in the appended claims and combinations thereof.

In one exemplary aspect of the present disclosure, there is provided a battery module including a frame; a plurality of battery cells arranged in the frame; a heat sink in contact with one side of the battery cell; and a cooling fin in contact with the heat sink and in contact with the other side of the battery cell.

The battery cell may be a pouch-type battery cell, and arranged in an up and down direction such that a widest surface of the battery cell faces an upper side and a lower side with respect to the frame.

The plurality of battery cells may be arranged to be symmetrical with respect to the heat sink.

With respect to the heat sink, a lower portion of any one of the battery cells may be in contact with the heat sink on an upper side of the heat sink, and an upper portion of another battery cell may be in contact with the heat sink on a lower side of the heat sink.

The cooling fin may include a first portion in contact with an opposite side of a part of the battery cell in contact with the heat sink; a second portion extending from the first portion toward the heat sink; and a third portion extending from the second portion and fixed in contact with the heat sink.

The cooling fin may be made of a metal material to cool the battery cell while being in contact with the battery cell to support the battery cell.

The battery module may further include a bus bar configured to connect electrode leads of the plurality of battery cells, and the bus bar may be in direct contact with the heat sink.

Each of the battery cells may be coupled to the heat sink or the cooling fin by a thermal glue.

In another exemplary aspect of the present disclosure, there is provided a battery pack including the battery module described above and a vehicle including the battery module.

The exemplary embodiments of the present disclosure may improve cooling performance even when the capacity of the battery cell increases, by direct cooling of the heat sink and indirect cooling of the cooling fin.

DETAILED DESCRIPTION

Figure 1:
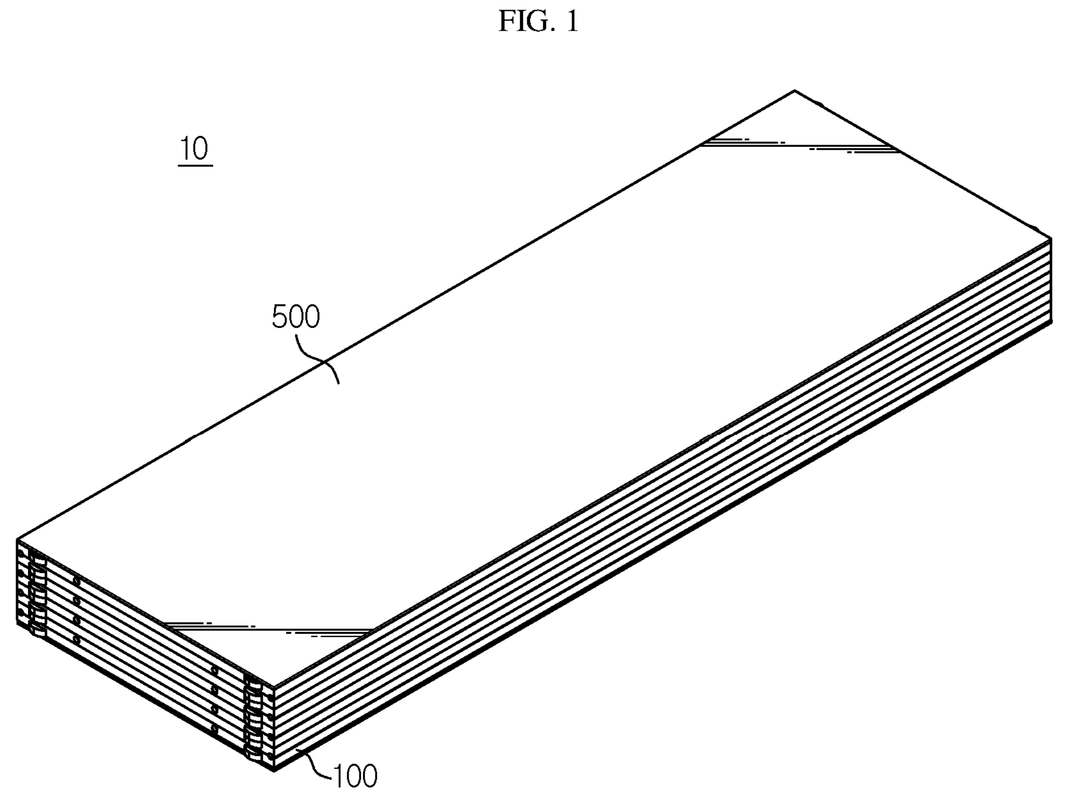
FIG. 1 is a perspective view of a battery module according to an exemplary embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustration only, not intended to limit the scope of the disclosure, so it should be understood that other equivalents and modifications could be made thereto without departing from the scope of the disclosure.

In the drawings, the size of each element or a specific portion constituting the element is exaggerated, omitted, or schematically illustrated for convenience and clarity of description. Accordingly, the size of each element does not fully reflect the actual size. If it is determined that a detailed description of a related known function or configuration may unnecessarily obscure the gist of the present disclosure, such description will be omitted.

As used herein, the term 'couple' or 'connect' includes not only a case where one member is directly coupled or directly connected to another member, but also a case where one member is indirectly coupled or indirectly connected to another member through a joint member.

Figure 2:
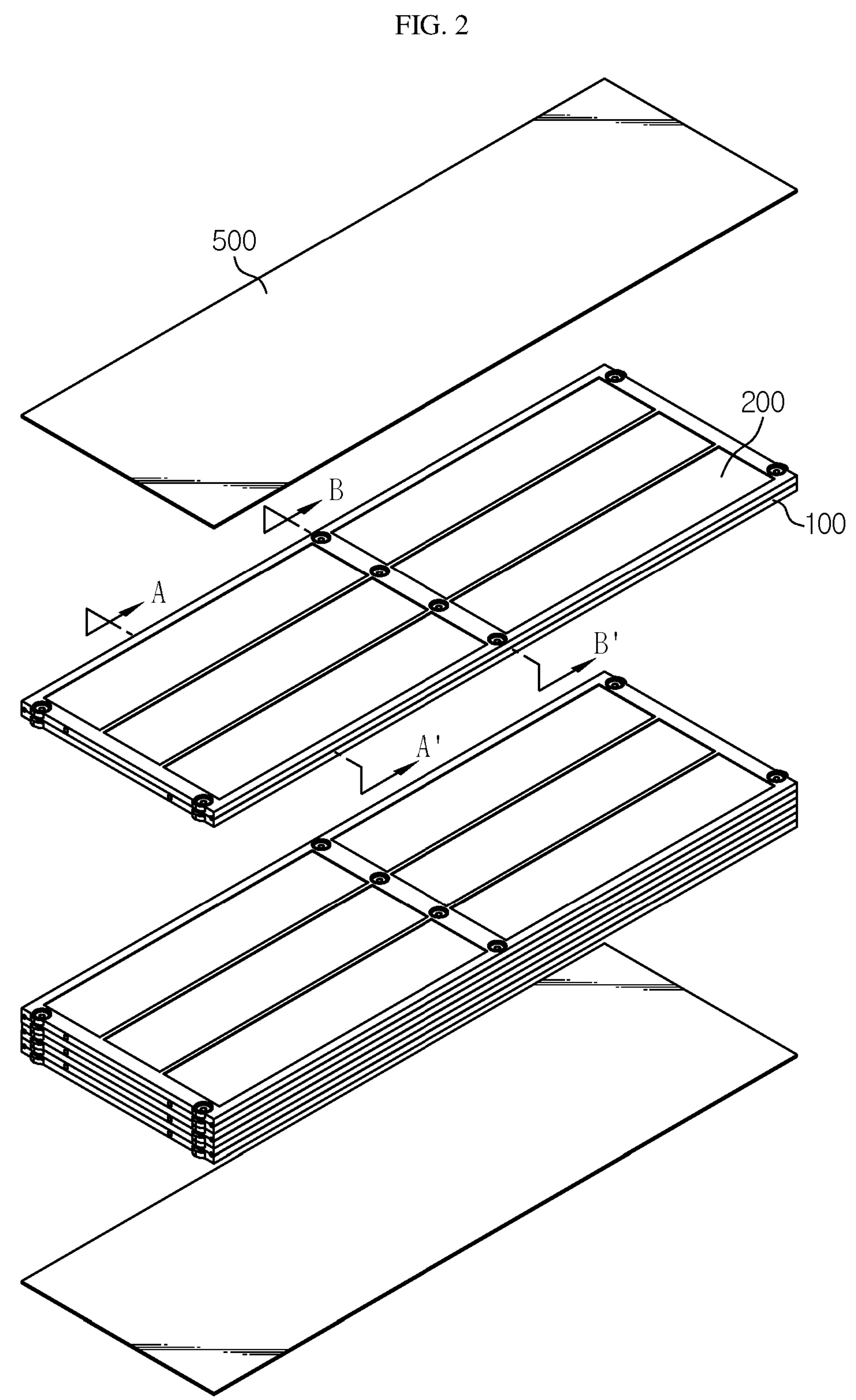
FIG. 2 is an exploded perspective view of the battery module according to an exemplary embodiment of the present disclosure.
Figure 3:
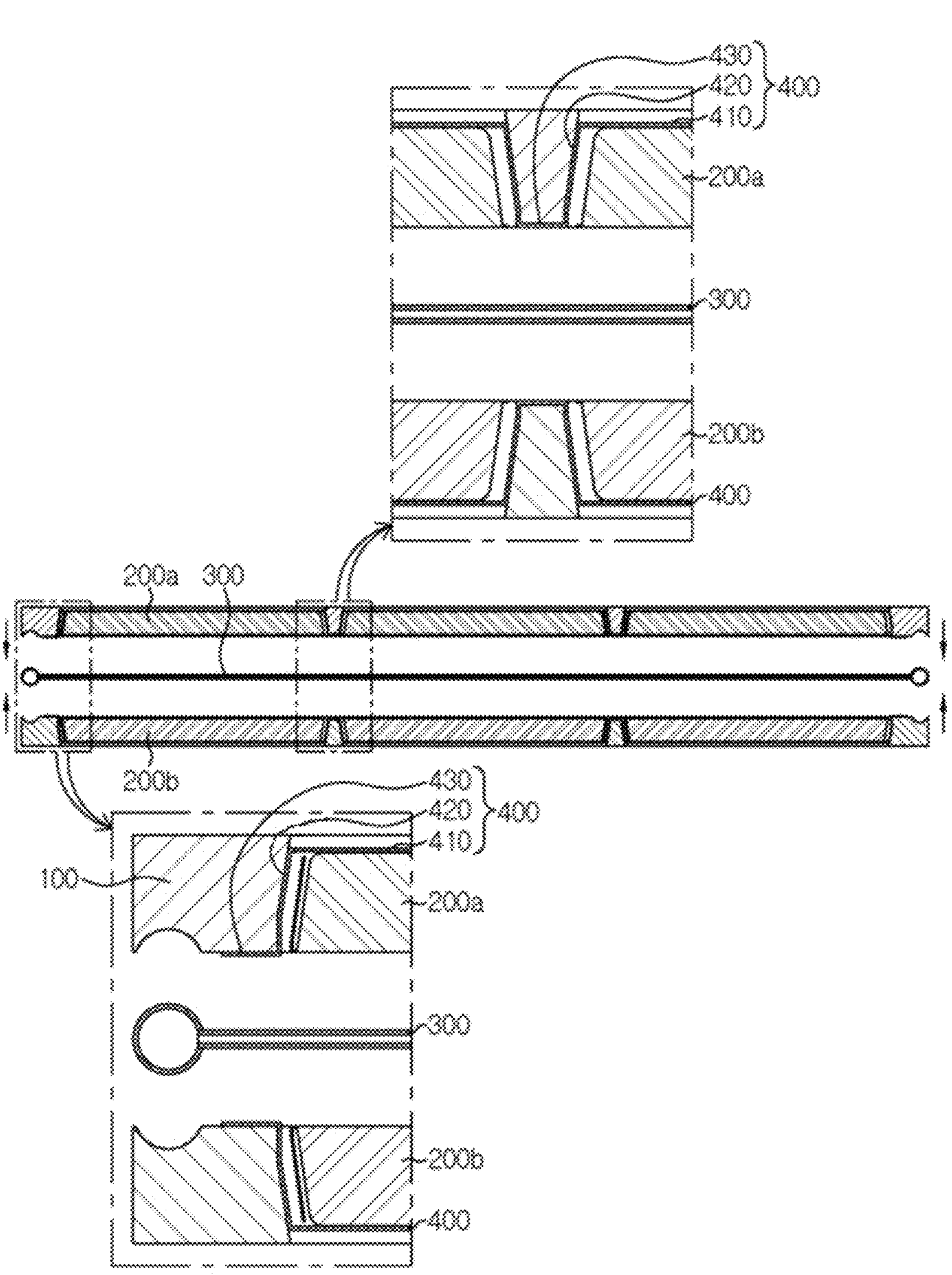
FIG. 3 is an illustration of the arrangement of a plurality of battery cells with respect to a heat sink in the battery module according to an exemplary embodiment of the present disclosure.
Figure 4:
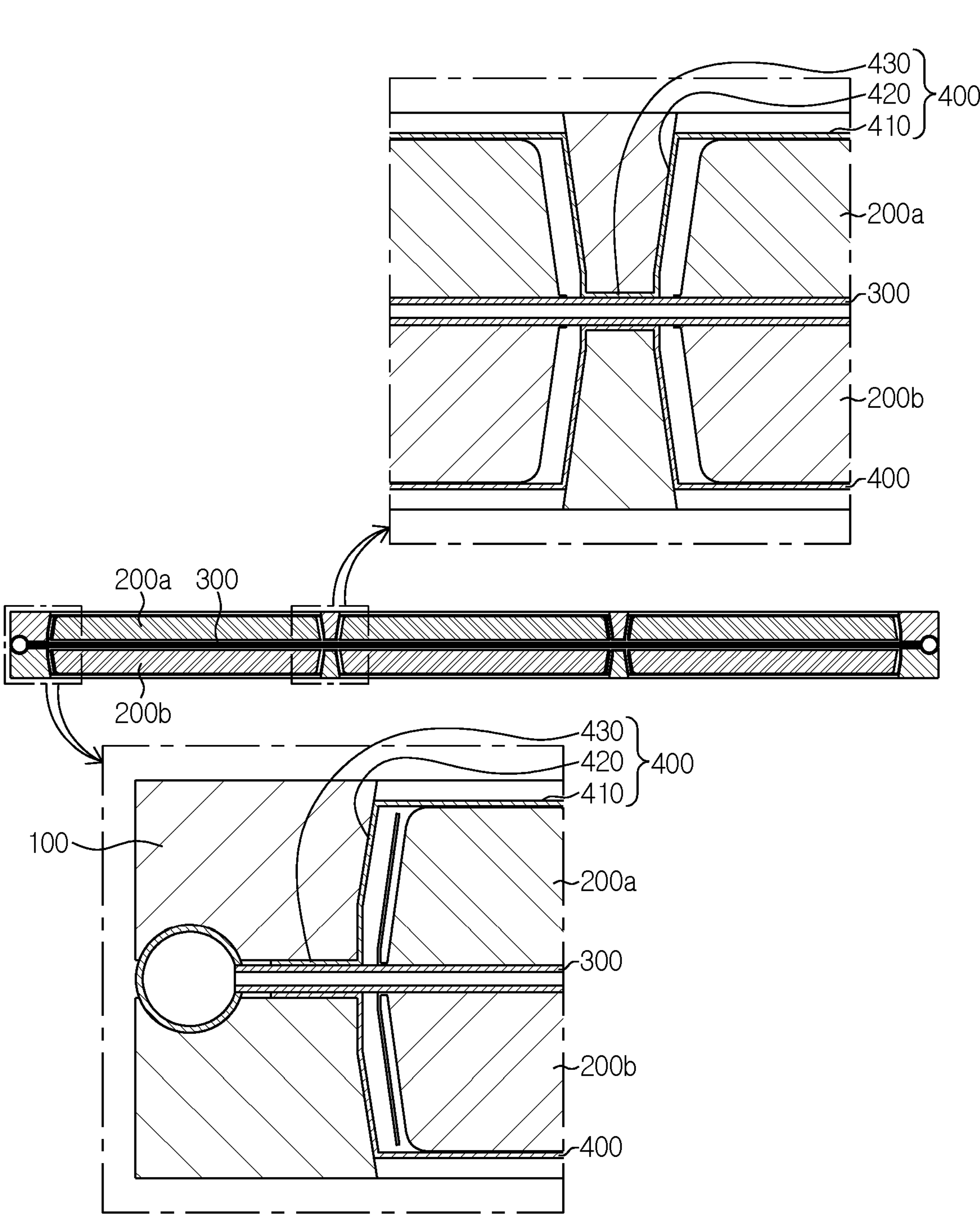
FIG. 4 is a cross-sectional view along line A-A' of FIG. 2.
Figure 5:
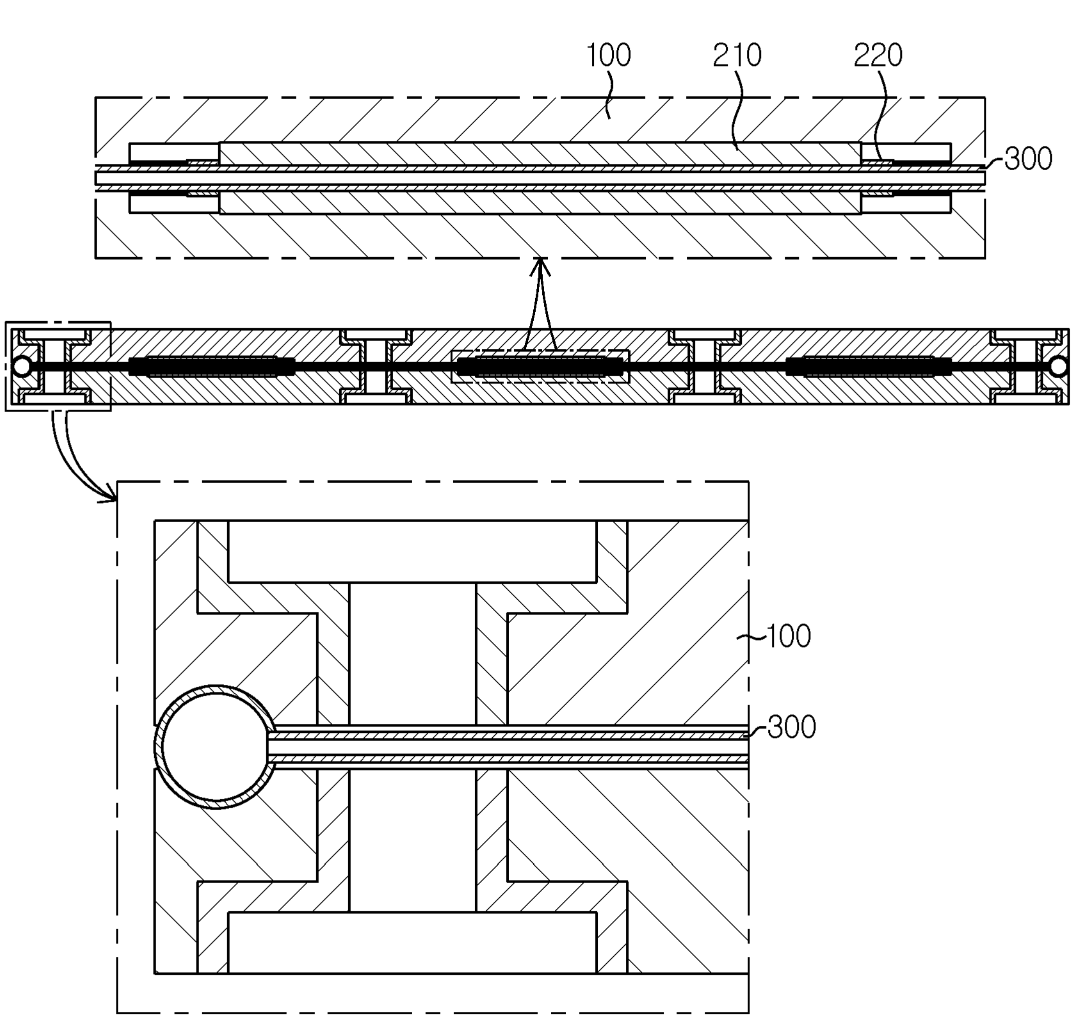
FIG. 5 is a cross-sectional view along line B-B' of FIG. 2.

FIG. 1 is a perspective view of a battery module according to an exemplary embodiment of the present disclosure, FIG. 2 is an exploded perspective view of the battery module according to an exemplary embodiment of the present disclosure, FIG. 3 is an illustration of the arrangement of a plurality of battery cells with respect to a heat sink in the battery module according to an exemplary embodiment of the present disclosure, FIG. 4 is a cross-sectional view along line A-A' of FIG. 2, and FIG. 5 is a cross-sectional view along line B-B' of FIG. 2.

As illustrated in FIGS. 1 to 5, a battery module 10 according to an exemplary embodiment of the present disclosure includes a frame 100, a plurality of battery cells 200, a heat sink 300, and a cooling fin 400.

The frame 100 may be formed in an approximately square to rectangular shape, but is not limited thereto. The frame 100 may be deformed into various shapes such as a circle, an oval, a rhombus, a triangle, etc. without departing from the scope of the present disclosure. When the frame 100 is formed in a rectangular shape, the length and width of the frame 100 may be changed according to a place where the frame 100 is to be installed or a size of a place where the frame 100 is used.

The battery cell 200 may be provided in various types, for example, a cylindrical type, a prismatic type, or a pouch type. Hereinafter, for convenience of description, a pouch type battery cell 200 will be mainly described.

A plurality of battery cells 200 are provided, and the plurality of battery cells 200 are arranged in the frame 100. As illustrated in FIG. 2, the plurality of battery cells 200 may be arranged in an up and down direction such that the widest surface of the pouch type battery cell 200 faces upper and lower sides with respect to the frame 100. That is, the battery cells 200 are arranged in the frame 100 to be laid horizontally.

Each of the battery cells 200 includes an electrode lead 220, and the electrode lead 220 provided in the battery cell 200 is a terminal exposed to the outside and connected to an external device and may use a conductive material.

The electrode lead 220 may include a positive electrode lead and a negative electrode lead. The positive electrode lead and the negative electrode lead may be disposed in opposite directions with respect to the longitudinal direction of the battery cell 200, or the positive electrode lead and the negative electrode lead may be located in the same direction with respect to the longitudinal direction of the battery cell 200.

The positive electrode lead and the negative electrode lead may be made of various materials. For example, the positive electrode lead may be manufactured of an aluminum material, and the negative electrode lead may be manufactured of a copper material.

The electrode lead 220 may be electrically coupled to a bus bar 210. The battery cell 200 may have a structure in which a plurality of unit cells or a plurality of bi-cells are stacked according to the capacity, wherein positive electrode plate-separator-negative electrode plate are sequentially arranged in a unit cell, and positive electrode plate-separator-negative electrode plate-separator-positive electrode plate-separator-negative electrode plate are sequentially arranged in a bi-cell.

Also, a cartridge (not shown) accommodating the battery cell 200 may be provided. The cartridge (not shown) may be manufactured by injection molding of plastic.

A connector element or a terminal element may be provided on the cartridge. The connector element may include, for example, various types of electrical connection components or connection members for connecting the battery module to a battery management system (BMS, not shown) and capable of providing data on the voltage or temperature of the battery cells 200, and the like.

In addition, the terminal element includes a positive electrode terminal and a negative electrode terminal as a main terminal connected to the battery cells 200, and a terminal bolt is provided on the terminal element to be electrically connected to the outside. Meanwhile, the battery cell 200 may have various shapes.

A cover 500 may be coupled to the plurality of battery cells 200. Here, the cover 500 surrounds at least a part of the plurality of battery cells 200 and protects the plurality of battery cells 200 from an external force.

The heat sink 300 is in contact with one side of the plurality of battery cells 200. As illustrated in FIGS. 3 and 4, when the battery cells 200 each disposed on the upper and lower sides move in an arrow direction toward the heat sink 300 located at the center thereof, the battery cells 200 are in contact with the heat sink 300.

As illustrated in FIG. 4, one side of the battery cells 200 is in direct contact with the heat sink 300. For example, the battery cells 200 may be provided such that a lower portion of any one battery cell 200*a* is in contact with the heat sink 300 at the upper side of the heat sink 300, and an upper portion of another battery cell 200*b* is in contact with the heat sink 300 at the lower side of the heat sink 300.

As described above, when the battery cell 200 is in direct contact with the heat sink 300, the cooling efficiency is improved compared to an indirect cooling method.

As illustrated in FIG. 4, the other side of the battery cells 200 is in contact with the cooling fin 400, and the cooling fin 400 is in contact with the heat sink 300, and thus direct cooling is performed on one side of the battery cell 200 by the heat sink 300, and indirect cooling is performed on the other side of the battery cell 200 by the cooling fins 400 and the heat sink 300.

That is, the cooling efficiency is improved compared to the battery cell of the related art that rely only on indirect cooling because two cooling methods including direct cooling and indirect cooling are applicable to one battery cell 200 in the battery module 10 according to an exemplary embodiment of the present disclosure.

In particular, as described above and illustrated in FIG. 2, the battery cells 200 may be arranged in the up and down direction such that the widest surface of the pouch type battery cell 200 faces the upper and lower sides with respect to the frame 100, and thus the contact area between the battery cells 200 and the heat sink 300 increases, thereby improving the cooling performance.

The heat sink 300 may be in contact with each of the plurality of battery cells 200 on both the upper side and the lower side thereof. For example, as shown in FIGS. 3 and 4, after the plurality of battery cells 200 are disposed to be symmetrical with respect to the heat sink 300, the heat sink 300 may be provided to be in contact with each of the plurality of battery cells 200 on both the upper side and the lower side of the heat sink 300.

The cooling fins 400 are also in contact with the heat sink 300 and the other side of the battery cell 200. That is, the cooling fin 400 indirectly cools the other side of the battery cell 200. In addition, the cooling fin 400 also serves as a structural support member supporting the battery cells 200.

As illustrated in FIGS. 3 and 4, the cooling fin 400 includes a first portion 410, a second portion 420, and a third portion 430.

The first portion 410 is in contact with the opposite side of a part of the battery cell 200 that is in contact with the heat sink 300, that is, the other side of the battery cell 200. That is, as illustrated in FIG. 4, the heat sink 300 is in contact with the lower portion of the battery cell 200*a* and the first portion 410 of the cooling fin 400 is in contact with the upper portion of the battery cell 200*a*. As also illustrated in FIG. 4, the heat sink 300 is in contact with the upper portion of the battery cell 200*b*, and the first portion 410 of the cooling fin 400 is in contact with the lower portion of the battery cell 200*b*.

The second portion 420 extends from the first portion 410 toward the heat sink 300.

In addition, the third portion 430 extends from the second portion 420 and is fixed in contact with the heat sink 300.

As described above, because the cooling fin 400 contacts both the heat sink 300 and the battery cell 200, the battery cell 200 may be indirectly cooled through the cooling fin 400. Also, because the cooling fin 400 is in contact with the battery cell 200 on the upper side of the battery cell 200 to support the battery cell 200, the battery cell 200 may be stably fixed by the cooling fin 400.

The cooling fin used in the battery cell of the related art is in contact with the battery cell and has only a cooling function that indirectly cools the battery cell, whereas the cooling fin 400 of the battery module 10 according to an exemplary embodiment of the present disclosure has not only a function of cooling the battery cell 200 but also a function of structurally supporting the battery cell 200 by differently configuring the structure of the cooling fin of the related art.

That is, the battery module 10 according to an exemplary embodiment of the present disclosure may be provided such that the battery cell 200 is in contact with the heat sink 300 and directly cooled and the battery cell 200 is structurally supported by the cooling fin 400.

To this end, the cooling fin 400 may be made of a metal material. That is, the cooling fin 400 may be manufactured of, for example, a metal material such as aluminum because the cooling fin 400 needs to have an excellent thermal conductivity to cool the battery cells 200, and also have rigidity to support the battery cells 200 by being in contact with the battery cells 200. However, the material of the cooling fin 400 is not limited thereto.

As illustrated in FIG. 5, the bus bar 210 is provided to connect the electrode lead 220 of each of the plurality of battery cells 200. Here, the bus bar 210 may be provided to be in direct contact with the heat sink 300, which enables direct cooling of the bus bar 210.

The battery cells 200 may be coupled to the heat sink 300 or the cooling fin 400 by a thermal glue. However, the present disclosure is not limited thereto, and the battery cells 200 may be coupled to the heat sink 300 or the cooling fin 400 by bonding or using a double-sided tape.

Hereinafter, the operation and effect of the battery module 10 according to an exemplary embodiment of the present disclosure will be described with reference to the drawings.

As illustrated in FIGS. 1 and 2, the plurality of battery cells 200 are provided, and the plurality of battery cells 200 may be arranged in the up and down direction such that the widest surface of the battery cell 200 faces the upper and lower sides with respect to the frame 100, that is, the battery cells 200 are arranged to be laid horizontally.

As also illustrated in FIGS. 3 and 4, direct cooling by the heat sink 300 and indirect cooling by the cooling fins 400, that is, both direct cooling and indirect cooling are performed on the battery cell 200 because one side of the battery cell 200 is in direct contact with the heat sink 300 and the other side of the battery cell 200 is in contact with the heat sink 300.

In addition, because the cooling fin 400 is in contact with the battery cell 200 on the other side of the battery cell 200 to support the battery cell 200, the battery cell 200 may be structurally supported by the cooling fin 400.

Also, as illustrated in FIG. 5, direct cooling of the bus bar 210 is possible because the bus bar 210 is also in direct contact with the heat sink 300.

Meanwhile, a battery pack (not shown) according to an exemplary embodiment of the present disclosure may include one or more battery modules 10 as described above. In addition, the battery pack (not shown) may further include a case accommodating the battery module 10, and various devices controlling the charging and discharging of the battery module 10, such as a Battery Management System (BMS), a current sensor, a fuse, and the like, in addition to the battery module 10.

Meanwhile, a vehicle (not shown) according to an exemplary embodiment of the present disclosure may include the battery module 10 or the battery pack (not shown) described above. The battery pack (not shown) may include the battery module 10. In addition, the battery module 10 according to an exemplary embodiment of the present disclosure may be applied to a vehicle (not shown), for example, a predetermined vehicle (not shown) provided to use electricity such as an electric vehicle or a hybrid vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

The present disclosure relates to a battery module, and a battery pack and a vehicle, each including the battery module, and in particular, may be applicable to an industry related to a secondary battery.

What is claimed is:

1. A battery module comprising:

a frame;

a plurality of battery cells arranged in the frame;

a heat sink in contact with a first side of each of the plurality of battery cells; and a cooling fin in contact with the heat sink and a second side of each of the plurality of battery cells, wherein the second side of each of the plurality of battery cells is opposite to the first side of each of the plurality of battery cells;

wherein the cooling fin comprises a metal material having rigidity so as to structurally support the plurality of battery cells;

wherein the cooling fin comprises a first portion in contact with the second side of each of the plurality of battery cells, a second portion extending from the first portion toward the heat sink, and a third portion extending from the second portion and fixed in contact with the heat sink, wherein the first portion and the third portion are substantially parallel.

2. The battery module of claim 1, wherein each of the plurality of battery cells is a pouch-type battery cell, and wherein the plurality of battery cells are arranged such that two widest surfaces of each of the plurality of battery cells face an upper side and a lower side of the frame, respectively.

3. The battery module of claim 2, wherein the plurality of battery cells are arranged to be symmetrical with respect to the heat sink.

4. The battery module of claim 3, wherein a lower surface of any one of the plurality of battery cells is in contact with an upper side of the heat sink, and an upper surface of another of the plurality of battery cells is in contact with a lower side of the heat sink.

5. The battery module of claim 1, further comprising a bus bar connecting electrode leads of the plurality of battery cells, wherein the bus bar is in direct contact with the heat sink.

6. The battery module of claim 1, wherein the plurality of battery cells are coupled to the heat sink or the cooling fin by a thermal glue.

7. A battery pack comprising a battery module according to claim 1.

8. A vehicle comprising a battery module according to claim 1.

9. The battery module of claim 1, wherein the metal material is aluminum.

* * * * *